Patented Mar. 31, 1953

2,633,465

UNITED STATES PATENT OFFICE 2,633,465

PENICILLIN SALTS OF AMINOPHENYL-PIPERIDINE

Harley W. Rhodehamel, Jr., Indianapolis, Ind., assignor to Eli Lilly and Company, Indianapolis, Ind., a corporation of Indiana No Drawing. Application February 13, 1952, Serial No. 271,427

2 Claims. (Cl. 260—239.1)

This invention relates to a novel penicillin salt and the preparation thereof.

I have discovered that N-(o-aminophenyl)-piperidine or its salts can be combined with penicillin or its salts by neutralization or metathetical reactions to form a sparingly soluble pencillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To 5 g. of a solution of penicillin (e. g. a commercial mixture of the several penicillins) dissolved in 50 ml. of amyl acetate are added 5 g. of N-(o-aminophenyl)-piperidine dissolved in 10 ml. of amyl acetate. The mixture is cooled and stirred occasionally whereupon the N-(o-aminophenyl)-piperidine salt of penicillin precipitates. The salt is isolated as by decantation or filtration, and dried in vacuo.

The salt is represented by the following formula in which P represents penicillin:

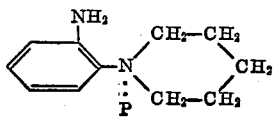

Example 2

To an aqueous solution of .3 g. of the potassium salt of penicillin G in .8 ml. of water is added a solution of .3 g. of N-(o-aminophenyl)-piperidine in 5 ml. of water. The mixture is cooled and stirred occasionally whereupon the slightly soluble N-(o-aminophenyl)-piperidine salt of penicillin G precipitates. The salt is separated, and dried in vacuo.

N-(o-aminophenyl)-piperidine can be prepared by condensing o-nitrochlorobenzene with piperidine, and reducing the condensation product catalytically with hydrogen and platinum catalyst.

I claim:

1. The N-(o-aminophenyl)-piperidine salt of penicillin represented by the following formula in which P represents penicillin:

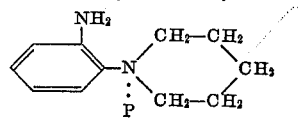

2. The N-(o-aminophenyl)-piperidine salt of penicillin G.

HARLEY W. RHODEHAMEL, Jr.

No references cited.